US009882867B2

(12) United States Patent
O'Connor et al.

(10) Patent No.: US 9,882,867 B2
(45) Date of Patent: *Jan. 30, 2018

(54) PROVIDING CONTENT TO DEVICES IN A CLUSTER

(71) Applicant: Google Inc., Mountain View, CA (US)

(72) Inventors: Timothy O'Connor, Moraga, CA (US); Abby W. Johns, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,485

(22) Filed: Mar. 7, 2016

(65) Prior Publication Data

US 2016/0191459 A1 Jun. 30, 2016

Related U.S. Application Data

(63) Continuation of application No. 13/804,021, filed on Mar. 14, 2013, now Pat. No. 9,313,169.

(51) Int. Cl.
*G06F 15/16* (2006.01)
*H04L 29/12* (2006.01)
(Continued)

(52) U.S. Cl.
CPC .... *H04L 61/2007* (2013.01); *G06F 17/30861* (2013.01); *H04L 67/00* (2013.01);
(Continued)

(58) Field of Classification Search
None
See application file for complete search history.

(56) References Cited

U.S. PATENT DOCUMENTS 6,751,663 B1 * 6/2004 Farrell .................... H04L 63/08
  709/223
8,392,575 B1   3/2013 Marr
  (Continued)

FOREIGN PATENT DOCUMENTS

JP   2009-510610   3/2009

OTHER PUBLICATIONS

International Search Report and Written Opinion in International Application No. PCT/US2014/021997, dated Dec. 15, 2014, 11 pages.

*Primary Examiner* — Mohamed Ibrahim
(74) *Attorney, Agent, or Firm* — Fish & Richardson P.C.

(57) ABSTRACT

Methods, systems, and apparatus, include computer programs encoded on a computer-readable storage medium, and include a method for providing content. The method includes receiving a request for content from a requesting device that includes an associated IP address and determining that the received request is appropriate for clustering based on the IP address. The method further includes determining whether the received request is already associated with a cluster including, and when not, returning a cluster cookie to the requesting device and storing cluster information including the IP address associated with the requesting device; otherwise creating a cluster including returning a cluster cookie to the requesting device and storing in a data set associated with the cluster information including the IP address associated with the requesting device. The method further includes providing a response to the received request based on the data set for an associated cluster.

16 Claims, 7 Drawing Sheets

(51) Int. Cl.
    *G06F 17/30*     (2006.01)
    *H04L 29/08*     (2006.01)
    *H04W 4/00*     (2009.01)

(52) U.S. Cl.
    CPC ............... *H04L 67/22* (2013.01); *H04W 4/00* (2013.01); *H04L 61/6068* (2013.01)

(56) References Cited

U.S. PATENT DOCUMENTS

| | | |
|---|---|---|
| 8,406,233 B2 | 3/2013 | Erman et al. |
| 8,838,832 B1 | 9/2014 | Thakur et al. |
| 8,856,131 B1 | 10/2014 | Liu et al. |
| 2006/0047831 A1 | 3/2006 | Piper |
| 2007/0078714 A1 | 4/2007 | Ott et al. |
| 2008/0320119 A1* | 12/2008 | Achan ............... H04L 29/12783 709/222 |
| 2011/0161172 A1 | 6/2011 | Lee |
| 2011/0258174 A1 | 10/2011 | Badros et al. |
| 2012/0057591 A1 | 3/2012 | Erman et al. |
| 2012/0116875 A1 | 5/2012 | Wang et al. |
| 2012/0158944 A1* | 6/2012 | Tiwari ................ H04L 61/2007 709/224 |
| 2012/0166282 A1 | 6/2012 | Reis et al. |
| 2012/0166379 A1 | 6/2012 | Dasgupta et al. |
| 2013/0054689 A1 | 2/2013 | Woldman et al. |
| 2013/0156040 A1 | 6/2013 | Erman et al. |
| 2014/0281031 A1 | 9/2014 | O'Connor et al. |
| 2015/0302481 A1* | 10/2015 | Callahan ............ G06Q 30/0269 705/7.29 |

* cited by examiner

PROVIDING CONTENT TO DEVICES IN A CLUSTER

CROSS-REFERENCE TO RELATED APPLICATION

This is a continuation of U.S. application Ser. No. 13/804,021, filed on Mar. 14, 2013, the disclosure of which is considered part of and is incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can be provided to users on any devices, such as personal computer (PCs), smartphones, laptop computers, or other user devices, including devices that access content through a common source.

SUMMARY

In general, one innovative aspect of the subject matter described in this specification can be implemented in methods that include a computer-implemented method for providing content. The method includes receiving a request for content from a requesting device, the request for content including an identifier (e.g., an internet protocol (IP) address) associated with the requesting device. The method further includes determining that the received request is appropriate for clustering based at least in part on the identifier (e.g., IP address). The method further includes determining whether the received request is already associated with a cluster including: determining whether the received request includes a cluster identifier (e.g., a cluster cookie), and when not, returning a cluster identifier (e.g., cookie) to the requesting device and storing, in a data set associated with the cluster, information including the identifier associated with the requesting device (e.g., the IP address). When the requesting device is already included in the cluster, the method includes evaluating the received request to determine whether an identifier for the requesting device in the data set associated with the cluster should be updated, and updating the data based on the evaluating. When the received request is not already associated with a cluster, the method further includes creating a cluster including returning a cluster identifier (e.g., cookie) to the requesting device and storing cluster information in a data set (e.g., including the IP address associated with the requesting device). The method further includes providing a response to the received request based at least in part on the data set for an associated cluster.

These and other implementations can each optionally include one or more of the following features. Determining a request is appropriate for clustering can include determining whether the IP address associated with the requesting device is associated with a proper entity, and when not, responding to the request without evaluating the clusters. The method can further include determining whether the IP address associated with the requesting device is in a range associated with an end user as opposed to an institution or public entity. The data set can include one or more entries, one for each device included in a cluster, and one or more entries can include a cluster cookie identifier, a device identifier, and an IP address associated with the requesting device. The data set can be periodically purged of IP addresses. The IP addresses for all entries in a cluster can be associated with a same subnet. All of the requesting devices in a cluster can be associated at least at one time with a same router. The router can be a residential router. Providing a response can further include selecting content for delivery responsive to the request based on information associated with one or more cluster cookies that are linked by the data set as being in a same cluster. The received request can include a cluster cookie associated with a first cluster and providing a response can further include selecting responsive content based at least in part on all the cluster cookies that are associated with the first cluster.

In general, another innovative aspect of the subject matter described in this specification can be implemented in systems that include a system for providing content. The system includes a processor and a memory including instructions that when executed cause the processor to: receive a request for content from a requesting device, the request for content including an identifier associated with the requesting device; determine that the received request is appropriate for clustering based at least in part on the identifier; determine whether the received request is already associated with a cluster including: determining whether the received request includes a cluster cookie, and when not, returning a cluster cookie to the requesting device and storing in a data set associated with the cluster information including the identifier associated with the requesting device; when the requesting device is already included in the cluster, evaluating the received request to determine whether the identifier for the requesting device in the data set associated with the cluster is required to be updated, and updating the identifier based on the evaluating; and when the received request is not already associated with a cluster, creating a cluster including returning a cluster cookie to the requesting device and storing, in a data set associated with the cluster, information including the identifier associated with the requesting device; and provide a response to the received request based at least in part on the data set for an associated cluster.

In general, another innovative aspect of the subject matter described in this specification can be implemented in computer program products that include a computer program product tangibly embodied in a computer-readable storage device and comprising instructions. The instructions, when executed by a processor, cause the processor to: receive a request for content from a requesting device, the request for content including an identifier associated with the requesting device; determine that the received request is appropriate for clustering based at least in part on the identifier; and determine whether the received request is already associated with a cluster. Determining whether the received request is already associated with a cluster includes determining whether the received request includes a cluster cookie, and when not, returning a cluster cookie to the requesting device and storing, in a data set associated with the cluster, information including the identifier associated with the requesting device. When the requesting device is already included in the cluster, the instructions cause the processor to evaluate the received request to determine whether the identifier for the requesting device in the data set associated with the cluster is required to be updated, and updating the identifier based on the evaluating. When the received request is not already associated with a cluster, a cluster is created including returning a cluster cookie to the requesting device and storing, in a data set associated with the cluster, information including the identifier associated with the requesting device. The instructions further provide a response to the received request based at least in part on the data set for an associated cluster.

Particular implementations may realize none, one or more of the following advantages. Content sponsors can achieve cross-device content presentation and remarketing by having their content selected and provided to users based on interactions by a given set of devices that are part of a cluster. Content sponsors can achieve higher click-through rates, conversion rates, and other positive results when clustered users in the same family receive more interesting content that is selected based on websites visited by other family members.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for allocating devices into a common cluster, e.g., based on Internet protocol (IP) address heuristics, and for using the cluster information for selecting content and remarketing. Content sponsors (e.g., advertisers) can implement device- and cluster-based content selection and serving in order to influence customer interaction (e.g., purchasing behavior). For example, the cluster information can be used with information about websites visited by users using devices in the cluster, in order to provide content (e.g., select advertisements). The cluster and website information can also be used to probabilistically assess the cluster's population size and composition. In some implementations, the cluster information can be used to store information about cross-device conversion metrics, e.g., based on membership in clusters.

Using the cluster information, content sponsors can also provide content in a way that identifies and avoids using sensitive advertising categories where cluster-based content selection and serving could potentially be invasive of privacy. Users can control the extent, if any, that their devices in the home and/or in other settings are used in clustering.

For situations in which the systems discussed here collect personal information about users, the users may be provided with an opportunity to elect to participate in or decline programs or features that may collect personal information (e.g., information about a user's social network, social actions or activities, a user's preferences, or a user's current location). In addition, certain data may be anonymized in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 1:
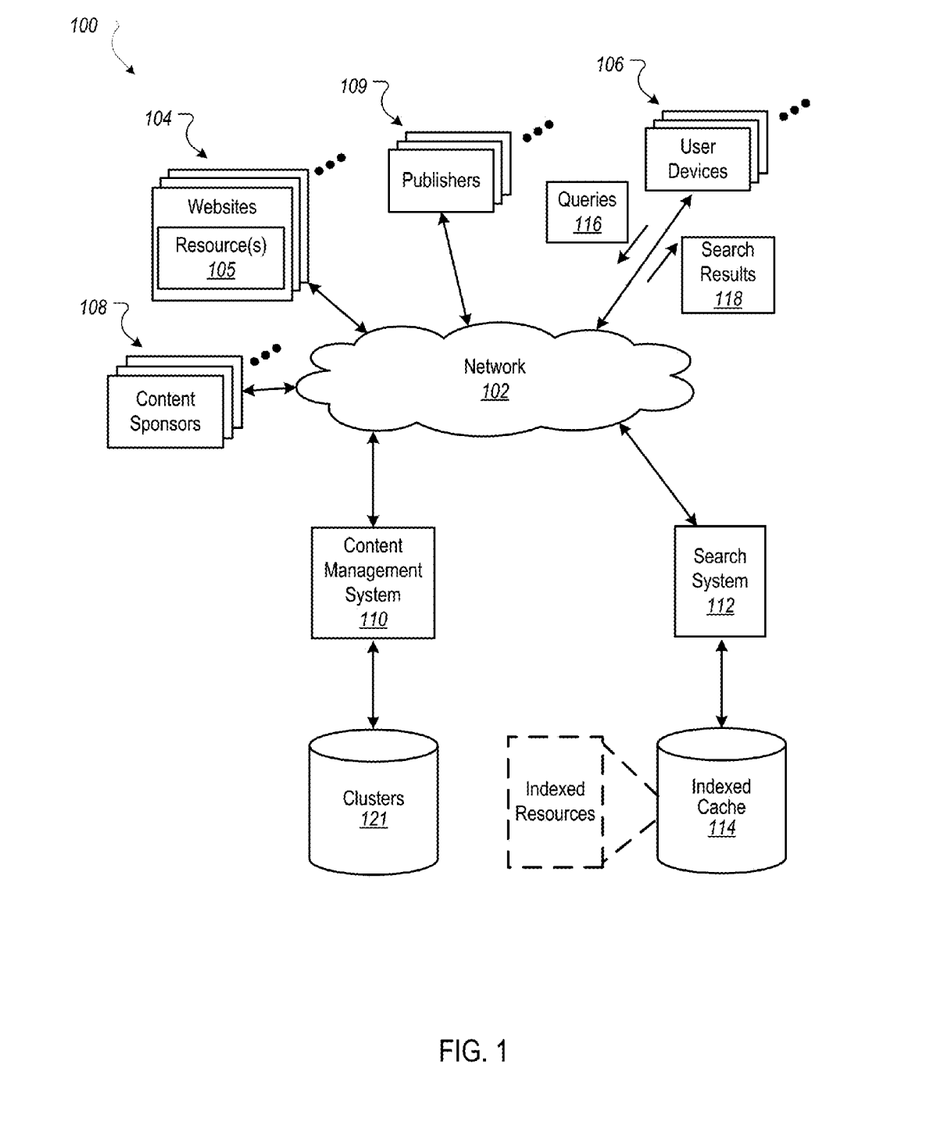
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, a data store of clusters 121 can store information for devices that have been grouped into a cluster. For example, devices 106 that are used by various members of the same family can be grouped into a cluster if all of the devices access content through the same router over a given time period.

In some implementations, individual users can be provided with information as to which clusters they belong. Users may use user privacy settings and/or other preferences to change how clustering information is used (or if at all). For example, while three members of a group that share the same router may be grouped into a cluster, another group member that shares the same router may elect not to be included. In some implementations, users can exercise an option to delete (or not save) information about a cluster. For example, one member of a cluster who is shopping for engagement rings can designate that the information or the cluster be deleted to prevent diamond-related ads from appearing on shared devices (e.g., tablets and/or mobile phones) of other users in a given cluster.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information that is associated with the mappings described above, can be used and/or evaluated when selecting eligible content.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by recognizing when one or more users are members of a cluster. For example, one cluster member, using a personal computer, may be in the same cluster as other cluster members, e.g., using a tablet computer and a smartphone, respectively. When content is selected and served to the one cluster member, for example, the selection can be based in part on websites accessed by other cluster members. This can increase the likelihood of a conversion, for example, by providing content that may be of more interest because the users are within the same cluster. The devices in this example need not be used by different members of the cluster, as clustering is based on the device, and the one cluster member may be just as likely to use other devices in addition to the personal computer.

Figure 2A:
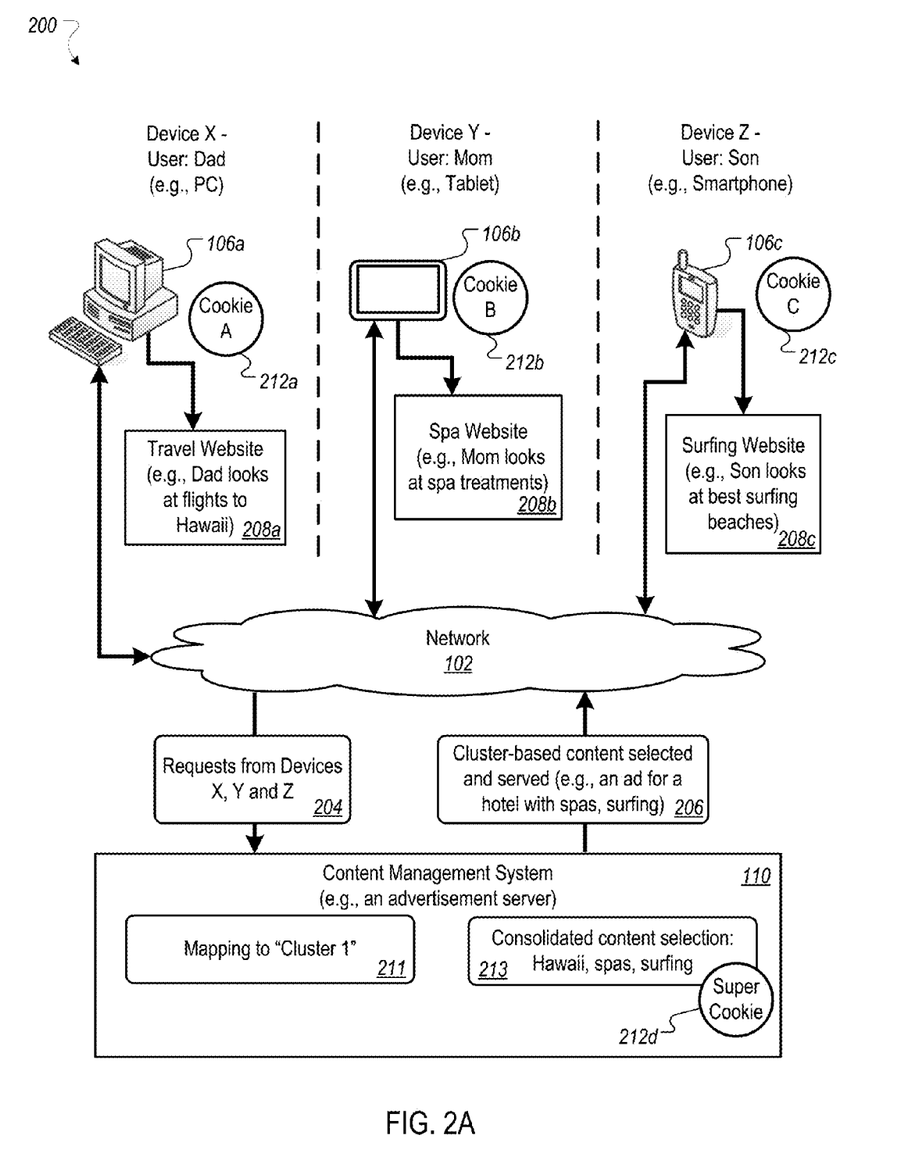
FIG. 2A shows an example system that includes a cluster of devices that receive content based on clustering.

FIG. 2A shows an example system 200 that includes a cluster of devices 106a-106c that receive content based on clustering. The cluster in this example can be associated with devices 106a-106c that may be used by members in the same cluster whose devices access content through the same router (e.g., a residential router, not shown in this figure). The devices 106a-106c can have IP addresses that are dynamically assigned by the router, so that the IP address of each device is within a pre-defined range of IP addresses, e.g., all starting with x.y.z (e.g., x.y.z.pdq, where x, y and z are three-digit numbers and where pdq are different for each device in the cluster). Devices that are clustered in this way, whether they have wireless or wired access to the Internet, can be grouped for the purposes of content selection. Other user-specific information, in addition to websites visited, can also be used to select and serve content.

As an example, cluster member A may use device X 106a (e.g., a PC) to access a travel website 208a. Cluster member B may use device Y 106b (e.g., a tablet computer) to access a spa website 208b. Cluster member C may use device Z 106c (e.g., a smartphone) to access a surfing website 208c. These example websites visited identifying user interests in hotels, spas and surfing are just examples of many interests that family members may have and that correspond to search queries, surfing the Web, and/or other activities. There may be other users and devices within the same household, some of which may be used by multiple users.

During an online session, requests for content 204 can be sent from their respective devices to the content management system 110, e.g., through the router and the network 102. Because all of the family/cluster members are accessing content through the same router, the IP addresses associated with the devices and requests can be set to be within a range of IP addresses that are appropriate for clustering. For example, devices in a household that are likely to belong to the same family can be deemed appropriate candidates for clustering, while devices in a public setting or belonging to an institution are likely to be inappropriate for clustering. In some implementations, the content management system 110 can create a cluster mapping 211, e.g., associating each of the devices X-Z 106a-106c with a cluster identifier (e.g., cluster ID 1). In some implementations, the clustering information can be stored in a cluster data set (e.g., within the data store of clusters 121), or stored in other ways.

In an example of how cluster information in the clusters 121 can be collected and subsequently used to select content, consider the websites accessed by the family members. As cluster member A accesses travel-related content on the travel website 208a, the content management system 110 can make cluster member A's device X 106a part of a cluster that is formed from devices using the same router. The content management system 110 can return a cluster cookie A 212a to cluster member A's device for local storage on the device. The same steps can occur for cluster member B and cluster member C, resulting in cluster cookies B 212b and C 212c that are stored on cluster member B's and cluster member C's devices, respectively. The information in the cluster cookies A-C 212a-212c can also be stored in a combined identifier (e.g., a super cookie) 212d, e.g., so that the content management system 110 has access to information for all of the family members in the cluster, including their interests. Cluster cookies can be in the form, for example, of a conventional cookie (e.g., with a designation or indicator that it is associated with clustering), a double-click cookie, or a separate type of cookie.

The content management system 110 can use the cluster information to select content in response to requests for content received from devices in the cluster. For example, when cluster member A visits the travel website 208a, e.g., related to Hawaiian travel/vacations, the content management system 110 can respond to a request for content from cluster member A's device with a consolidated content selection 213 based on the request and interests of family members in the cluster. For example, to fill an advertisement slot on the travel website 208a, the content management system 110 can select an advertisement based at least in part on cluster member A's Web use as well as cluster member B's interests (e.g., in spas) and cluster member C's interests (e.g., in surfing), e.g., based on the websites they visited. As a result, the content management system 110 can provide a cluster-based content selection 206, e.g., an advertisement for a hotel in Hawaii that has a spa and is close to popular surfing beaches.

Figure 2B:
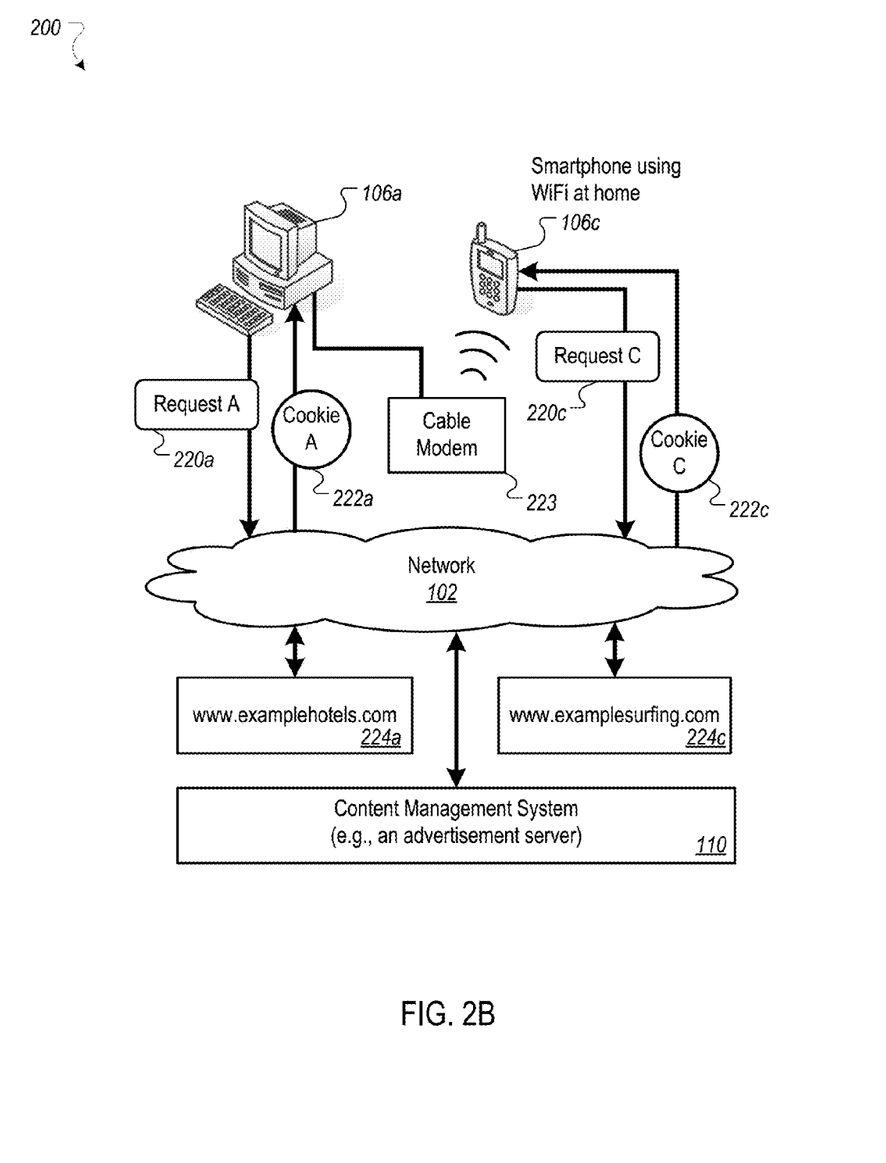
FIG. 2B shows another view of the system in which clustered devices access content using a modem.

FIG. 2B shows another view of the system 200 in which clustered devices 106a and 106c access content using a modem 223. For example, device 106a (e.g., cluster member A's PC) has a wired connection to the modem 223, and device 106c (e.g., cluster member C's smartphone using WiFi at home) has a wireless communication link with the modem 223. There can be other devices with wired and wireless communication links with the modem 223.

When cluster member A accesses content (e.g., the website 224a www.examplehotels.com), the content management system 110 can detect that the IP address associated with cluster member A's device is within a range of IP addresses that is assigned to a first cluster group (e.g., one created based on IP addresses associated with the modem 223). In response to a request for content A received from cluster member A's device 106a, the content management system 110 can provide content responsive to the request. At the same time, a cluster cookie 222a (e.g., having cluster cookie ID "A") can also be provided for storage on cluster member A's device, as described in more detail below. Similarly, cluster cookie C 222c (e.g., having cluster cookie ID "C") can be provided to cluster member C's device 106c when content is provided in response to a request for content 220c. This can occur, for example, while cluster member C is accessing the website 224c (e.g., www.examplesurfing- .com). Subsequent requests for content that are provided from devices 106a and 106c to the content management system 110 can include a cluster cookie ID associated with the cluster cookie stored on the respective device (e.g., which the content management system 110 can use to look up cluster information and select content based on the information).

Figure 3A:
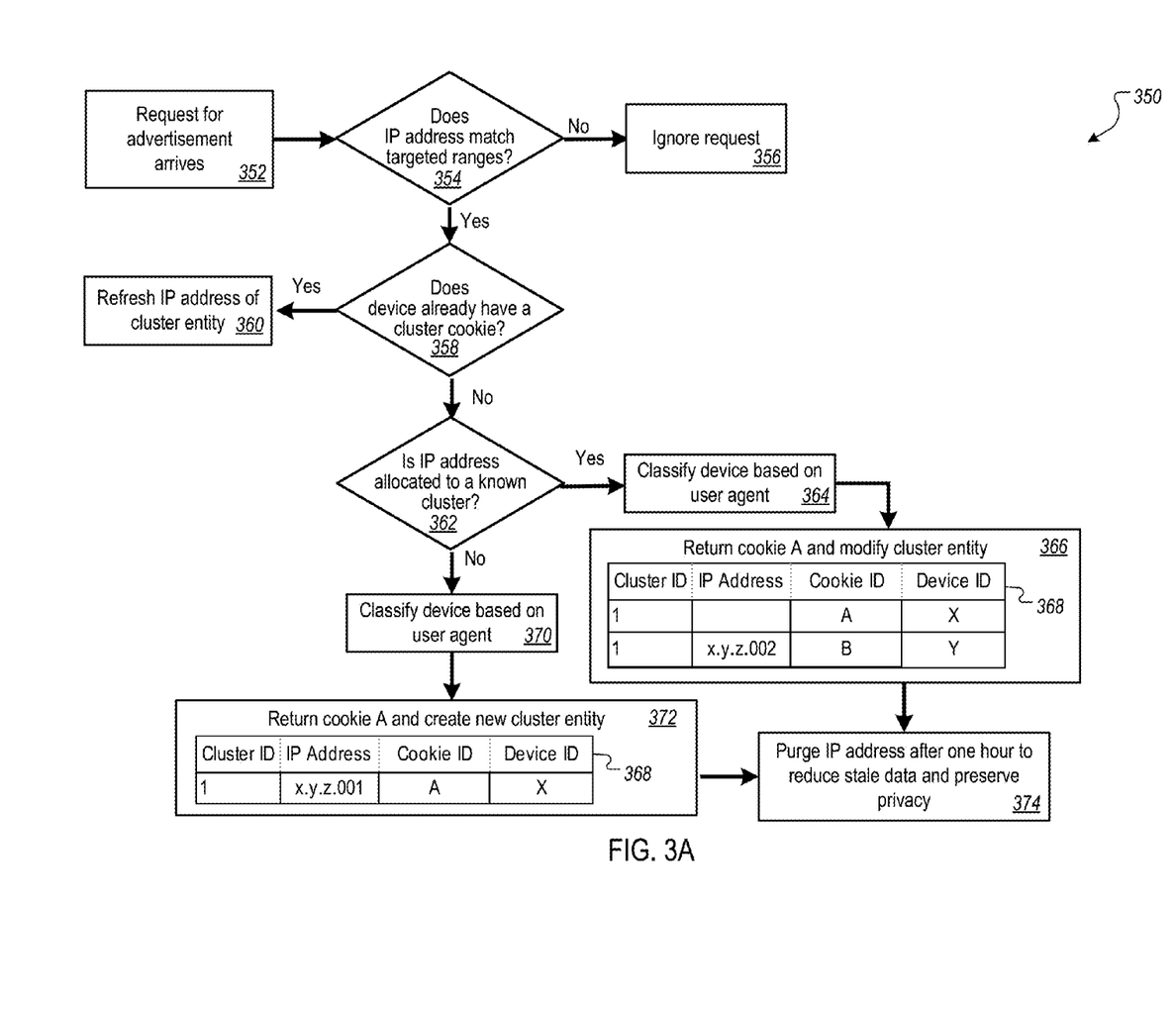
FIG. 3A is a flowchart of an example process for creating clusters of related devices.

FIG. 3A is a flowchart of an example process 350 for creating clusters of related devices. In some implementations, the content management system 110 can perform steps of the process 350 using instructions that are executed by one or more processors. FIGS. 1-2B are used to provide example structures for performing the steps of the process 350.

A request for an advertisement arrives (352). For example, the content management system 110 can receive the request 220a from the device 106, e.g., for cluster member A who is accessing content on the website 224a (e.g., www.examplehotels.com). The request for content can be to fill an advertisement slot on the web page.

A determination is made whether the IP address associated with the device making the request matches selected ranges of IP addresses that are eligible for clustering. For example, the content management system 110 can check the received IP address (e.g., x.y.z.001) is within one of the known IP address ranges that are appropriate for clustering. Appropriate ranges can include, for example, IP ranges assigned to the personal devices (as opposed to commercial devices).

If the IP address is inappropriate, the request is ignored (356). For example, the request may be associated with an IP address at an Internet cafe or some other institution or public entity, indicating that the request has originated from an inappropriate device, for the purposes of clustering. The device may be appropriate for clustering in another setting, such as if the device is cluster member C's smartphone that accesses content at home, e.g., through the family's router, in which an IP address associated with an appropriate IP address range is used.

However, if the IP address matches selected (e.g., appropriate) ranges, then a determination is made whether the device already has an associated cluster cookie. For example, the request can include the cluster cookie identifier (e.g., cluster member A's cluster cookie ID A) of the requesting device that can match existing cluster information accessible by the content management system 110 (e.g., cluster data set 368).

When a cluster cookie is provided along with a given request from the device, then the IP address of the cluster cookie entity can be refreshed (360). For example, the IP address (e.g., x.y.z.001) can be written or over-written in the cluster data set 368 by the content management system 110.

If no cluster cookie is provided, a check is made as to whether the IP address associated with the requesting device has been allocated to a known cluster. For example, the content management system 110 can check IP address of the requesting device (e.g., A) against entries in the cluster data set 368 to see if any cluster exists in the cluster data set 368 that includes the appropriate IP address range.

When the IP address is allocated to a cluster (e.g., based on entries in the cluster data set 368 for the cluster/IP address, cluster ID and cookie ID), then the device is classified (e.g., based on a user agent) (364). For example, the user agent associated with the Internet session can include information for the user and associated device and device type. A cluster cookie ID (e.g., A) can be created and be returned to the requesting device (e.g., device 106a), and an existing cluster entity can be modified (e.g., by the content management system 110). For example, an entry can be added to the cluster data set 368 that includes the cluster ID (e.g., 1), the IP address (e.g., x.y.z.001), the cluster cookie ID (e.g., A) and the device ID (e.g., X). This entry can be added to cluster information that already includes, for example, an entry for cluster member B's tablet computer, e.g., cluster ID 1, the IP address x.y.z.002, cluster cookie ID B, and device ID Y.

When the IP address is not allocated to a cluster, then the device is classified (e.g., based on a user agent) (370). A cluster cookie ID (e.g., A) is returned to the requesting device (e.g., device 106a), and a new cluster entity is created (e.g., by the content management system 110). For example, an entry for the cluster can be added to the cluster data set 368 that includes the cluster ID (e.g., 1), the IP address (e.g., x.y.z.001), the cluster cookie ID (e.g., A) and the device ID (e.g., X).

Periodically (e.g., every hour or some other time period), IP addresses are purged, e.g., to reduce stale data and to preserve privacy. For example, the content management system 110 can delete or null out the IP address (e.g., x.y.z.001) in a cluster data set when more than an hour has passed since the user (e.g., cluster member A) has accessed the Internet in a setting that is appropriate for clustering.

In some implementations, clusters can be updated or deleted if devices associated with the cluster do not periodically access the Internet from the same IP address. For example, if cluster member A's desktop PC and cluster member C's WiFi-enabled smartphone both have cluster cookies present, it may be expected that the two devices access the Internet from the same IP address, at least once in a while. If regular accesses do not occur (e.g., based on a threshold time of a week), then the cluster can be dissolved, or one or more suspect entries can be removed.

Figure 3B:
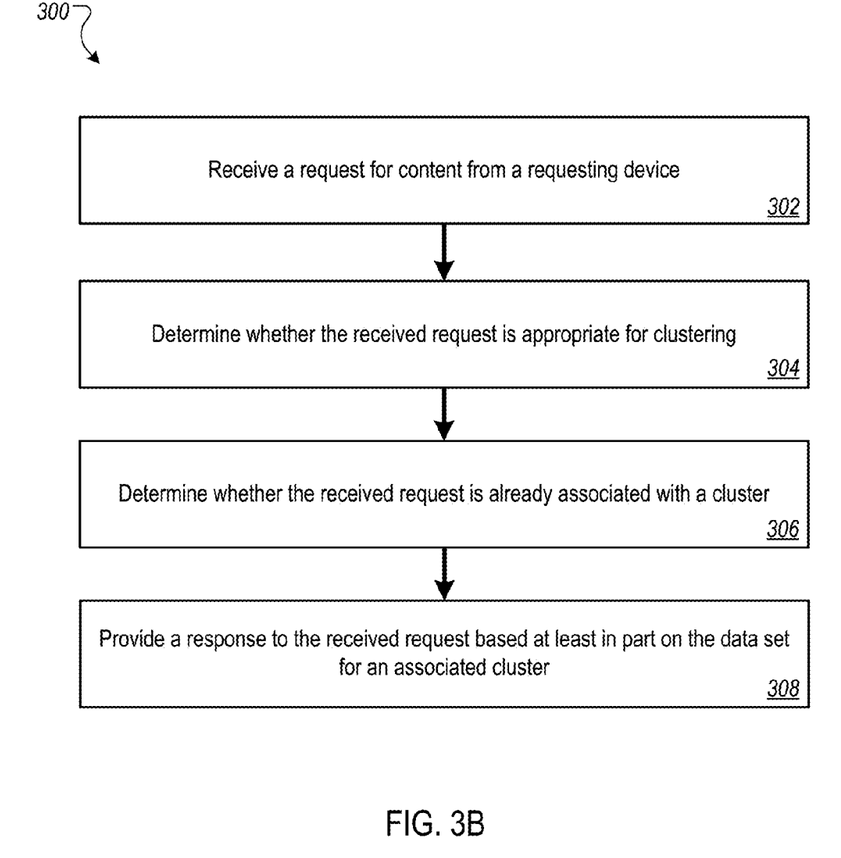
FIG. 3B is a flowchart of an example process for providing content based on clustered devices.

FIG. 3B is a flowchart of an example process 300 for providing content based on clustered devices. In some implementations, the content management system 110 can perform steps of the process 300 using instructions that are executed by one or more processors. FIGS. 1-3A are used to provide example structures for performing the steps of the process 300.

A request for content is received from a requesting device (302). As an example, the content management system 110 (e.g., an advertisement server) can receive the request 220a from the device 106, e.g., for a user accessing content on the website 224a (e.g., www.examplehotels.com). The request for content includes an internet protocol (IP) address associated with the requesting device. For example, the request 220a that is received by the content management system 110 can include the IP address x.y.z.001 of the device 106a (e.g., cluster member A's PC).

A determination is made as to whether the received request is appropriate for clustering (e.g., based at least in part on the IP address) (304). As an example, the content management system 110 can compare the received IP address (e.g., x.y.z.001) of cluster member A's PC with known IP address ranges. In some implementations, determining that the request is appropriate for clustering can include determining whether the IP address associated with the requesting device is associated with a proper entity, and when not, responding to the request without evaluating any clusters. For example, the determination may find that the IP address is in a range associated with an end user, indicating an appropriate device, as opposed to the IP address being associated with and institution or public entity, indicating an inappropriate device.

For example, the determination may result in finding that the IP address is appropriate for clustering, such as if the IP address is in a range of IP addresses assigned to the same router (e.g., a residential router in a family's home). Such IP address ranges are appropriate, e.g., because they may be associated with multiple devices for a family. In this example, all of the IP addresses for all entries in a cluster (e.g., in clustering data set 368) are associated with a same subnet. The determination may instead result in finding that the IP address is inappropriate for clustering, such as if the IP address is in a range of IP addresses assigned to an Internet cafe or to a company for computers used by employees during working hours. Such IP addresses may be viewed as inappropriate, e.g., because an employee's smartphone might not be a good candidate to be clustered with a computer of a co-worker that happens to be in his proximity. In some implementations, companies can optionally provide for clustering of work computers, such as if employees are working on a collaborative effort and can benefit from clustering.

A determination is made whether the received request is already associated with a cluster (306). For example, the content management system 110 can look up information in existing clusters using the IP address and/or a device ID. The determination may identify, for example, cluster 1 as a cluster associated with cluster member A's PC based on information in the clustering data set 368. A more detailed description regarding the cluster determination is provided below with reference to FIG. 3C. In some implementations, a given device can be associated with multiple clusters.

A response to the received request is provided based at least in part on the data set for an associated cluster (308). As an example, in response to the request 220*a* and based in part on any clusters associated with cluster member A's PC, the content management system 110 can return content that is responsive to the request. Information about clusters associated with cluster member A's device can be obtained, for example, in the clustering data set 368. If the request 220*a* is cluster member A's request for a hotel, for example, and if cluster member A's PC is clustered with cluster member B's tablet and cluster member C's smartphone, then an advertisement returned by the content management system 110 can be related to a hotel that has a spa and is near a popular surfing beach.

In some implementations, providing a response can further include selecting content for delivery responsive to the request based on information associated with one or more cluster cookies that are linked by the data set as being associated with a same cluster. For example, responses to requests can be based on keywords and/or other information stored for the set of cookies identified in the clustering data set 368 and/or stored in a super cookie or other structure that includes information from all cookies associated with a cluster. In some implementations, responding to a request can include using location information for a given device.

In some implementations, the received request of step 302 can include a cluster cookie associated with a first cluster and, and providing a response can further include selecting responsive content based at least in part on all the cluster cookies that are associated with the first cluster. For example, the request 220*a* can include the cluster cookie identifier A that identifies and is associated with the cluster having cluster ID 1 associated with cluster member A's PC. In response to the request, the content management system 110 can select content (e.g., a hotel advertisement) based at least in part on a super cookie that includes information associated with cluster member B's interests (e.g., in spas) and cluster member C's interests (e.g., in surfing).

In some implementations, once a cluster cookie is stored on a device, it may not matter how the device accesses a given network (e.g., a mobile laptop once cookied with a cluster cookie can move to another location and have a different IP address associated with that new location). For example, once cluster member C's laptop is associated with the family's home network cluster (e.g., having cluster ID 1 in the clustering data set 368) and has a cluster cookie ID (e.g., A) stored, then cluster member C can go anywhere and the cluster information can be retrieved no matter how cluster member C accesses a given network. As an example, cluster member C can go to any network, such as served by WiFi at a public coffee shop or Internet cafe. Cluster member C's request for content might have an IP address that would ordinarily not be considered, e.g., is in a range of IP addresses known to be within a public range. However, because cluster member C's PC is associated with the cluster that was generated previously (e.g., in appropriate, non-public, non-institutional setting), then content can be served to cluster member C's PC based at least in part on the cluster information (e.g., making use of the cookie cluster that is delivered as part of the content request).

Figure 3C:
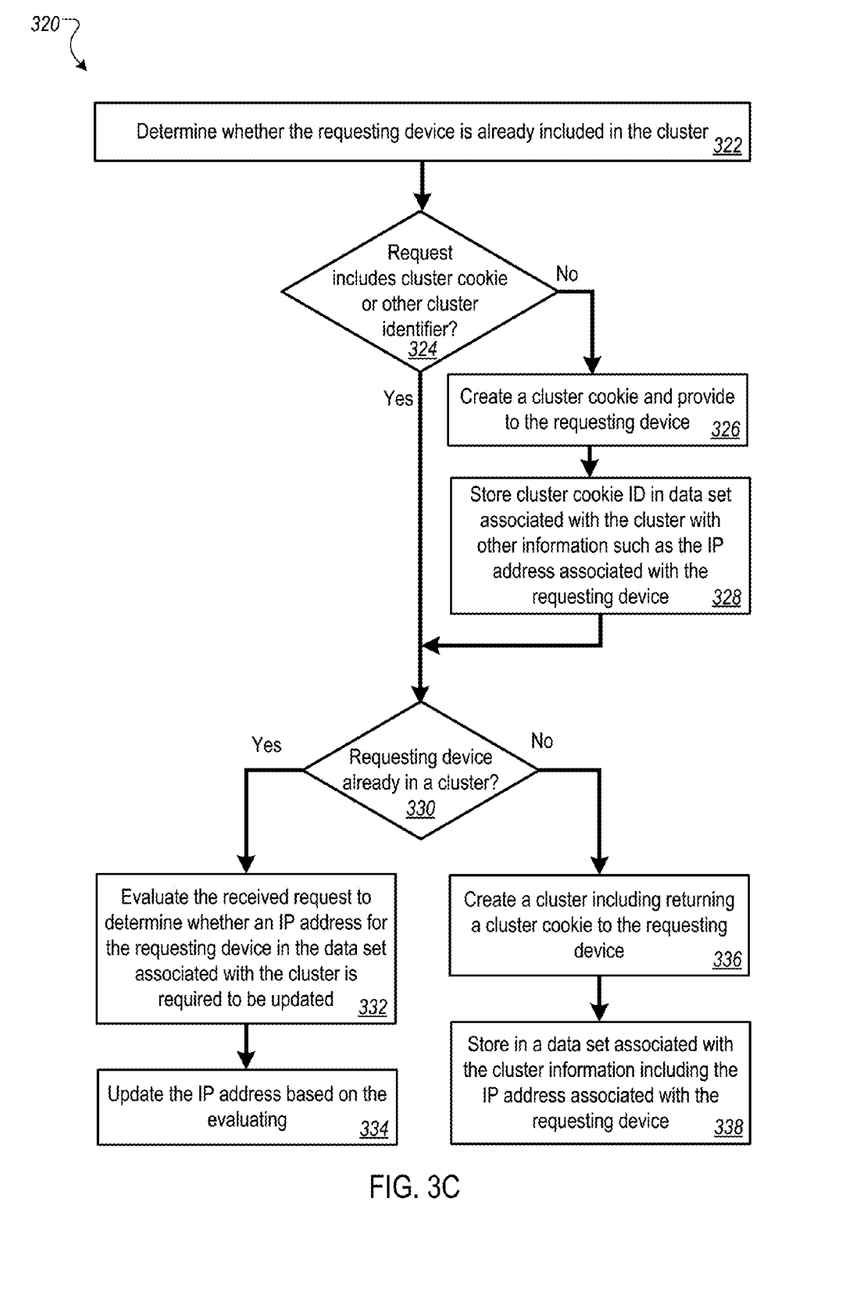
FIG. 3C is a flowchart of an example process for determining whether a received request is already associated with a cluster.

FIG. 3C is a flowchart of an example process 320 for determining whether a received request is already associated with a cluster. For example, the steps in process 320 can represent detailed steps for step 306 of the process 300 described above with reference to FIG. 3B. In some implementations, the content management system 110 can perform steps of the process 320 using instructions that are executed by one or more processors. FIGS. 1-3A are used to provide example structures for performing the steps of the process 320.

A determination is made whether the requesting device is already included in a cluster (322). For example, the content management system 110 can check for the existence of cluster member A's PC in clustering data set 368, such as by using the IP address or the device ID associated with cluster member A's PC.

The determination can include determining whether the received request includes a cluster cookie or other cluster identifier (324). As an example, when making the request for content, the device 106*a* can also send the cluster cookie or the ID of the cluster cookie A that is stored on cluster member A's PC.

When the received request does not include a cluster cookie (the device is appropriate for clustering but has not yet been added to a cluster), a cluster cookie is created and provided to the requesting device (326). For example, the first time that a request is received from cluster member A's PC, there would be no cluster cookie received with cluster member A's device request. A cluster cookie A can be created and provided to cluster member A's PC so as to enable its return in subsequent requests received from cluster member A's PC. A cookie ID associated with the cluster cookie can be stored in a data set associated with the cluster (e.g., along with other information such as the IP address associated with the requesting device (328). As an example, the cookie ID associated with the cluster cookie A 212*a* can be stored in the clustering data set 368, e.g., in a row associated with cluster member A's PC. Other storage techniques can be used.

In some implementations, a data set for clustering information can include one or more entries, one for each device included in a cluster, and wherein one or more entries includes a cluster cookie identifier, a device identifier, and an IP address associated with the requesting device. For example, the clustering data set 368 includes rows for each device in the cluster, and each row includes a cluster ID (e.g., 1), an IP address (e.g., x.y.z.001), a cluster cookie ID (e.g., A), and a device ID (e.g., X). In some implementations, the data set can be periodically purged of IP addresses. For example, the content management system 110 can automatically purge IP addresses in the clustering data set 368 that are a certain threshold age (e.g., one hour), such as by blanking out the IP address or assigning a null value. An example blanked-out IP address appears in the clustering data set 368 shown in step 366 of the process 350 described with reference to FIG. 3A.

A determination is made whether the requesting device is already in a cluster (330). For example, the content management system 110 can check for the existence of cluster member A's cluster cookie A 212a in clustering data set 368.

When the requesting device is already included in a cluster, the received request is evaluated to determine whether an IP address for the requesting device in the data set associated with the cluster is required to be updated (332). For example, the content management system 110 can check the IP address stored in the clustering data set 368 associated with cluster member A's PC. If the IP address does not exist (e.g., due to time-based staleness purging), then the IP address (e.g., cluster member A's PC's IP address of x.y.z.001) can be updated based on the evaluating (334).

When the received request is not already associated with a cluster, a cluster is created and a cluster cookie is returned to the requesting device (336). As an example, the content management system 110 can create one or more entries in the clustering data set 368 that are associated with cluster member A's PC. This may be the case, for example, if one or more existing entries exist that are in the same IP address range (e.g., x.y.z.000 to x.y.z.00n) that corresponds to computer devices accessing the same router in the cluster member A's (and cluster member B's and cluster member C's) family home. A cookie ID associated with the cluster cookie is stored in a data set associated with the cluster information including the IP address associated with the requesting device (338). For example, when the clustering data set 368 is updated, the entry for cluster member A's PC can include the cluster cookie ID A associated with cluster member A's PC.

Figure 4:
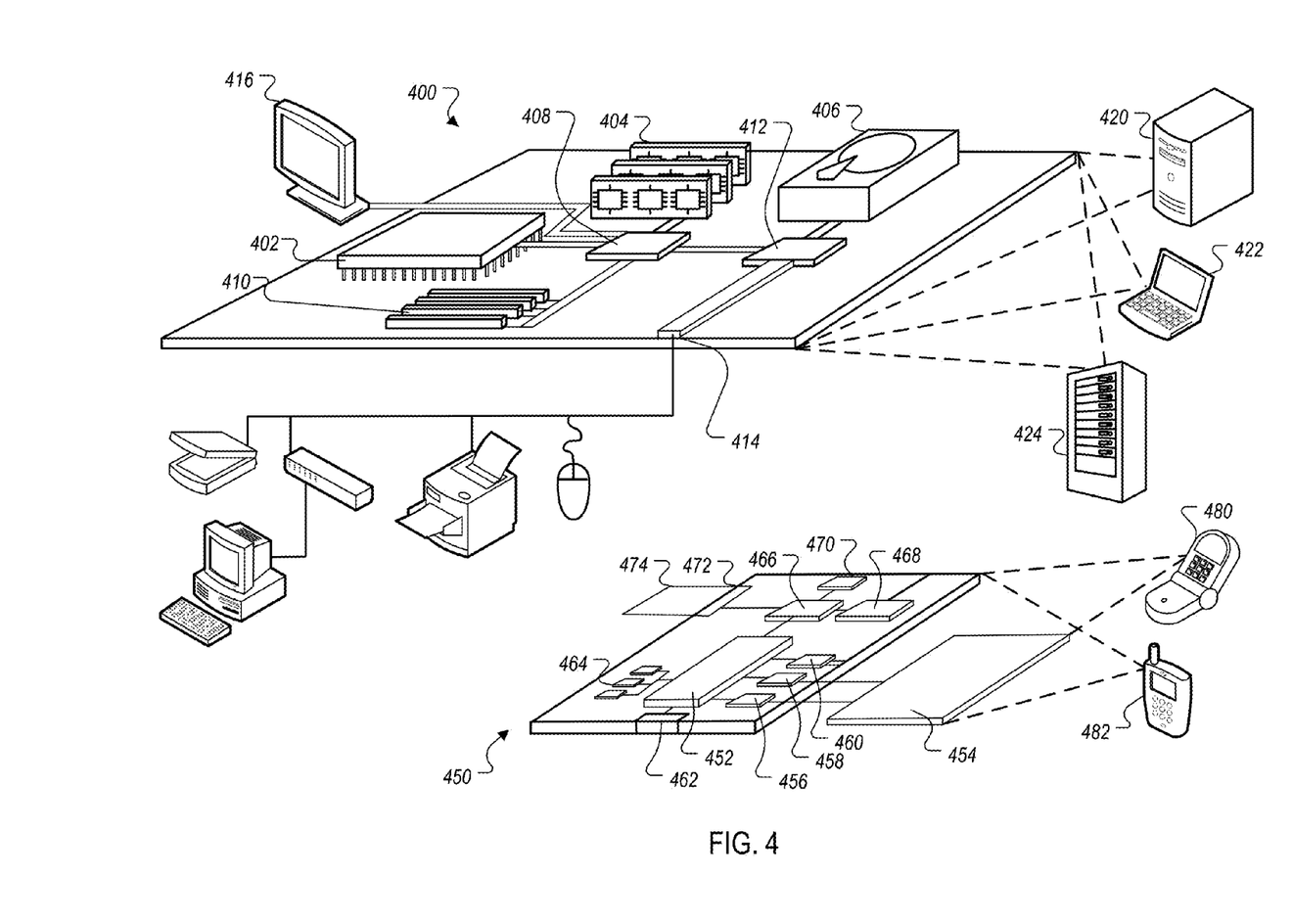
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be an example only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    detecting internet protocol (IP) addresses for each of multiple different user devices that are connected to a network;
    determining that the detected IP addresses are within a range of IP addresses corresponding to a same network access device;
    determining, based on the detected IP addresses being within the range of the IP addresses corresponding to the same network access device, that it is appropriate to cluster network activity of the multiple different user devices based on the multiple different user devices accessing the Internet with the same network access device;
    aggregating network activity data for each of the multiple different user devices based on the determination that the different user devices are accessing the Internet with the same network access device, including:
        issuing a cluster cookie to each of the multiple different user devices; and
        collecting network activity data from the cluster cookie issued to each of the multiple user devices;
    receiving a request for content from one user device of the multiple different user devices; and
    responding to the request, including:
        generating and providing a response to the request based, at least in part, on the aggregated network activity for each of the multiple different user devices that was collected from each of the multiple different user devices using the cluster cookie when the request is received from a proper entity, and
        responding to the request without generating and providing the response based on the aggregated network activity when the request is not associated with a proper entity.

2. The computer-implemented method of claim 1 wherein the network activity data includes one or more entries, one entry for each user device included in a cluster associated with the cluster cookie and including a device identifier and an IP address associated with the user device.

3. The computer-implemented method of claim 2 wherein the received request includes the cluster cookie that identifies the cluster, and wherein generating and providing the response includes selecting responsive content based at least in part on all the one or more entries for the cluster.

4. The computer-implemented method of claim 1 wherein all of the multiple different user devices in a cluster are associated at least at one time with a same router.

5. The computer-implemented method of claim 4 wherein the same router is a residential router.

6. The computer-implemented method of claim 1 further comprising periodically purging IP addresses from the network activity data.

7. The computer-implemented method of claim 1 wherein the IP addresses for all entries in a cluster are associated with a same subnet.

8. A system that includes:
    one or more processors; and
    a memory including instructions that when executed cause the one or more processors to:
        detect internet protocol (IP) addresses for each of multiple different user devices that are connected to a network;
        determine that the detected IP addresses are within a range of IP addresses corresponding to a same network access device;
        determine, based on the detected IP addresses being within the range of the IP addresses corresponding to the same network access device, that it is appropriate to cluster network activity of the multiple different user devices based on the multiple different user devices accessing the Internet with the same network access device;
        aggregate network activity data for each of the multiple different user devices based on the determination that the different user devices are accessing the Internet with the same network access device, including:

issuing a cluster cookie to each of the multiple different user devices; and collecting network activity data from the cluster cookie issued to each of the multiple user devices;

receive a request for content from one user device of the multiple different user devices; and respond to the request, including performing operations including:

generating and providing a response to the request based, at least in part, on the aggregated network activity for each of the multiple different user devices that was collected from each of the multiple different user devices using the cluster cookie when the request is received from a proper entity, and responding to the request without generating and providing the response based on the aggregated network activity when the request is not associated with a proper entity.

9. The system of claim 8 wherein the network activity data includes one or more entries, one entry for each user device included in a cluster associated with the cluster cookie and including a device identifier and an IP address associated with the user device.

10. The system of claim 8 wherein the instructions further cause the one or more processors to periodically purging IP addresses from the network activity data.

11. The system of claim 8 wherein the IP addresses for all entries in a cluster are associated with a same subnet.

12. The system of claim 8 wherein all of the multiple different user devices in a cluster are associated at least at one time with a same router.

13. A computer program product tangibly embodied in a computer-readable storage device and comprising instructions that, when executed by one or more processors, cause the one or more processors to:

detect internet protocol (IP) addresses for each of multiple different user devices that are connected to a network;

determine that the detected IP addresses are within a range of IP addresses corresponding to a same network access device;

determine, based on the detected IP addresses being within the range of the IP addresses corresponding to the same network access device, that it is appropriate to cluster network activity of the multiple different user devices based on the multiple different user devices accessing the Internet with the same network access device;

aggregate network activity data for each of the multiple different user devices based on the determination that the different user devices are accessing the Internet with the same network access device, including:

issuing a cluster cookie to each of the multiple different user devices; and collecting network activity data from the cluster cookie issued to each of the multiple user devices;

receive a request for content from one user device of the multiple different user devices; and respond to the request, including performing operations including:

generating and providing a response to the request based, at least in part, on the aggregated network activity for each of the multiple different user devices that was collected from each of the multiple different user devices using the cluster cookie when the request is received from a proper entity, and responding to the request without generating and providing the response based on the aggregated network activity when the request is not associated with a proper entity.

14. The computer program product of claim 13 wherein the network activity data includes one or more entries, one entry for each user device included in a cluster associated with the cluster cookie and including a device identifier and an IP address associated with the user device.

15. The computer program product of claim 13 wherein the instructions further cause the one or more processors to periodically purging IP addresses from the network activity data.

16. The computer program product of claim 13 wherein the IP addresses for all entries in a cluster are associated with a same subnet.

* * * * *